(12) United States Patent
Porter

(10) Patent No.: US 6,308,491 B1
(45) Date of Patent: Oct. 30, 2001

(54) STRUCTURAL INSULATED PANEL

(76) Inventor: William H. Porter, P.O. Box 249, Saugatuck, MI (US) 49453

( * ) Notice: Subject to any disclaimer, the term of this patent is extended or adjusted under 35 U.S.C. 154(b) by 0 days.

(21) Appl. No.: 09/414,909

(22) Filed: Oct. 8, 1999

(51) Int. Cl.[7] ..................................................... E04C 2/34
(52) U.S. Cl. .................. 52/794.1; 52/309.9; 52/309.16
(58) Field of Search ............... 52/794.1, 309.8, 52/309.9, 309.12, 309.7, 309.16, 364, 793.1

(56) References Cited

U.S. PATENT DOCUMENTS

| | | |
|---|---|---|
| 919,057 | 4/1909 | Moore . |
| 1,250,594 | 12/1917 | Knapp . |
| 2,111,922 | 3/1938 | Borkenstein . |
| 2,875,478 | 3/1959 | Andre . |
| 3,557,840 | 1/1971 | Maybee . |
| 3,654,053 | 4/1972 | Toedter . |
| 3,731,449 | 5/1973 | Kephart, Jr. . |
| 3,911,554 | 10/1975 | Ford . |
| 4,024,684 | 5/1977 | Holmgren . |
| 4,037,377 | 7/1977 | Howell et al. . |
| 4,051,641 | 10/1977 | Elliott . |
| 4,068,437 | 1/1978 | Byxbe et al. . |
| 4,147,004 | 4/1979 | Day et al. . |
| 4,169,688 | 10/1979 | Toshio . |
| 4,170,859 | 10/1979 | Counihan . |
| 4,402,170 | 9/1983 | Seidner . |
| 4,430,833 | 2/1984 | Balzer et al. . |
| 4,443,988 | 4/1984 | Coutu, Sr. . |
| 4,471,591 | 9/1984 | Jamison . |
| 4,671,038 | 6/1987 | Porter . |
| 4,704,837 | 11/1987 | Menchetti et al. . |
| 4,726,973 | 2/1988 | Thompson . |
| 4,765,105 | 8/1988 | Tissington et al. . |
| 4,786,547 | 11/1988 | St-Michel . |
| 4,856,244 | 8/1989 | Clapp . |
| 4,865,912 | 9/1989 | Mitsumata . |
| 4,932,171 | 6/1990 | Beattie . |
| 5,058,333 | 10/1991 | Schwartz . |
| 5,062,250 | 11/1991 | Buzzella . |
| 5,081,810 | 1/1992 | Emmert . |
| 5,140,086 | 8/1992 | Hunter et al. . |
| 5,345,738 | 9/1994 | Dimakis . |
| 5,428,929 | 7/1995 | Reese . |
| 5,497,589 | 3/1996 | Porter . |
| 5,628,158 | 5/1997 | Porter . |
| 5,638,651 | 6/1997 | Ford . |
| 5,842,314 | 12/1998 | Porter . |
| 5,950,389 | 9/1999 | Porter . |
| 5,953,883 | 9/1999 | Ojala . |
| 6,131,365 * | 10/2000 | Crockett ............................. 52/794.1 |

* cited by examiner

Primary Examiner—Peter M. Cuomo
Assistant Examiner—Hanh V. Tran
(74) Attorney, Agent, or Firm—Ermrich & Dithmar

(57) ABSTRACT

A generally planar structural insulated panel for building construction includes interior and exterior facings of weather resistant plastic impregnated paper (PIP) disposed on opposed outer surfaces of an inner insulating core such as of plastic foam or an agricultural product such as wheatboard or strawboard. Spaced elongated, linear studs are attached to either the outer or inner surface of one or both of the PIP facings. The spaced studs, which are preferably comprised of metal or wood, increase the panel's strength, facilitate connecting the panel to a building structure in a secure manner, and facilitate attachment of a structural facing such as of gypsum or cementous composite or exterior siding to the panel. When attached to the inner surface of a PIP facing, the stud is disposed in the panel's insulating core. When disposed on the outer surface of a PIP facing, the studs provide a gap between a PIP facing and an outer facing such as of exterior siding to allow for water drainage. In one embodiment, slots are provided between the insulating core and the interior and exterior facings on one or more edges of the panel or about the entire periphery of the panel for receiving a metal C-shaped channel, or spline. The peripheral C-shaped channel substantially increases panel strength, and facilitates connecting adjacent panels together as well as installing the panel in a building structure with or without the use of 2× dimensional structural lumber.

9 Claims, 4 Drawing Sheets

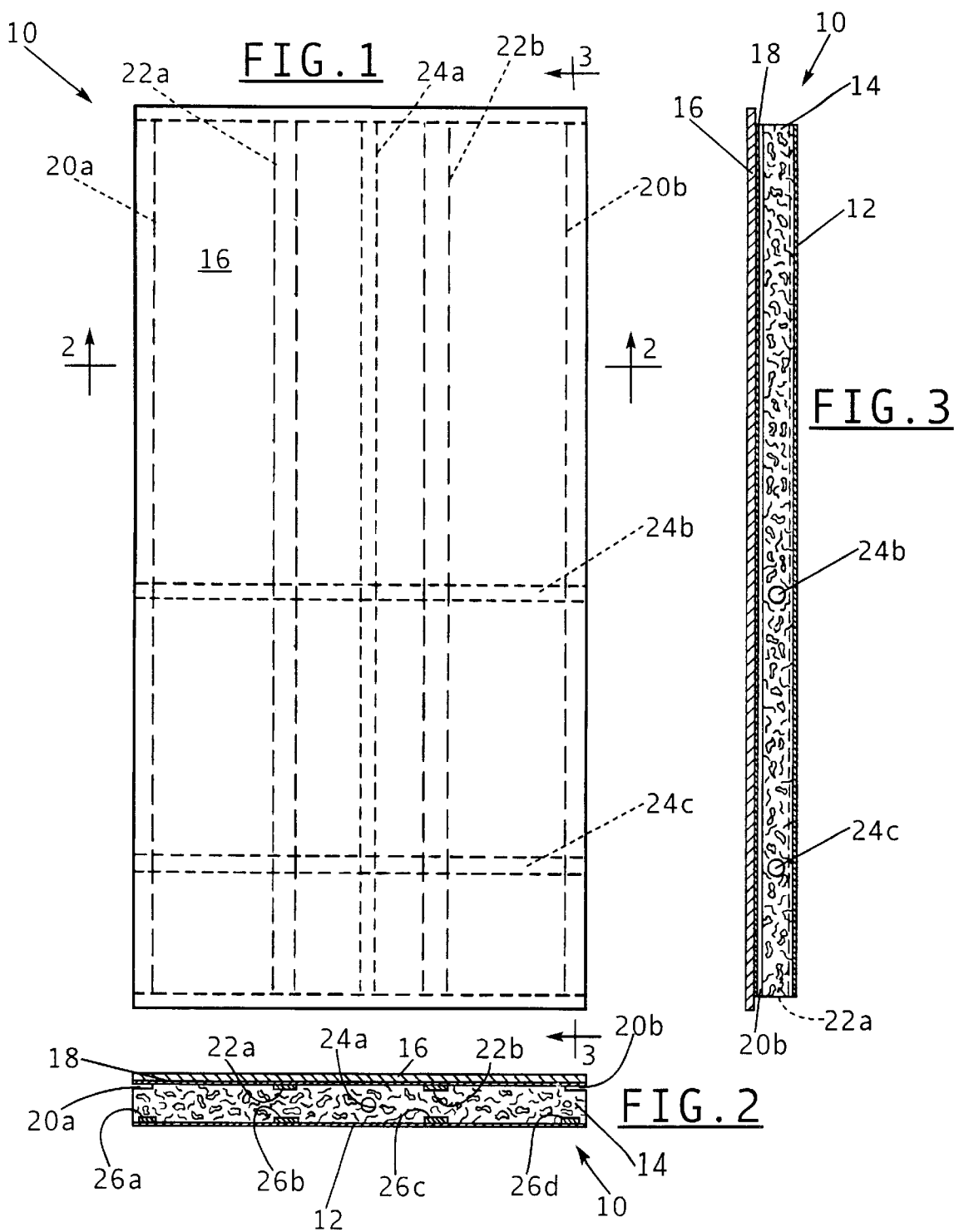

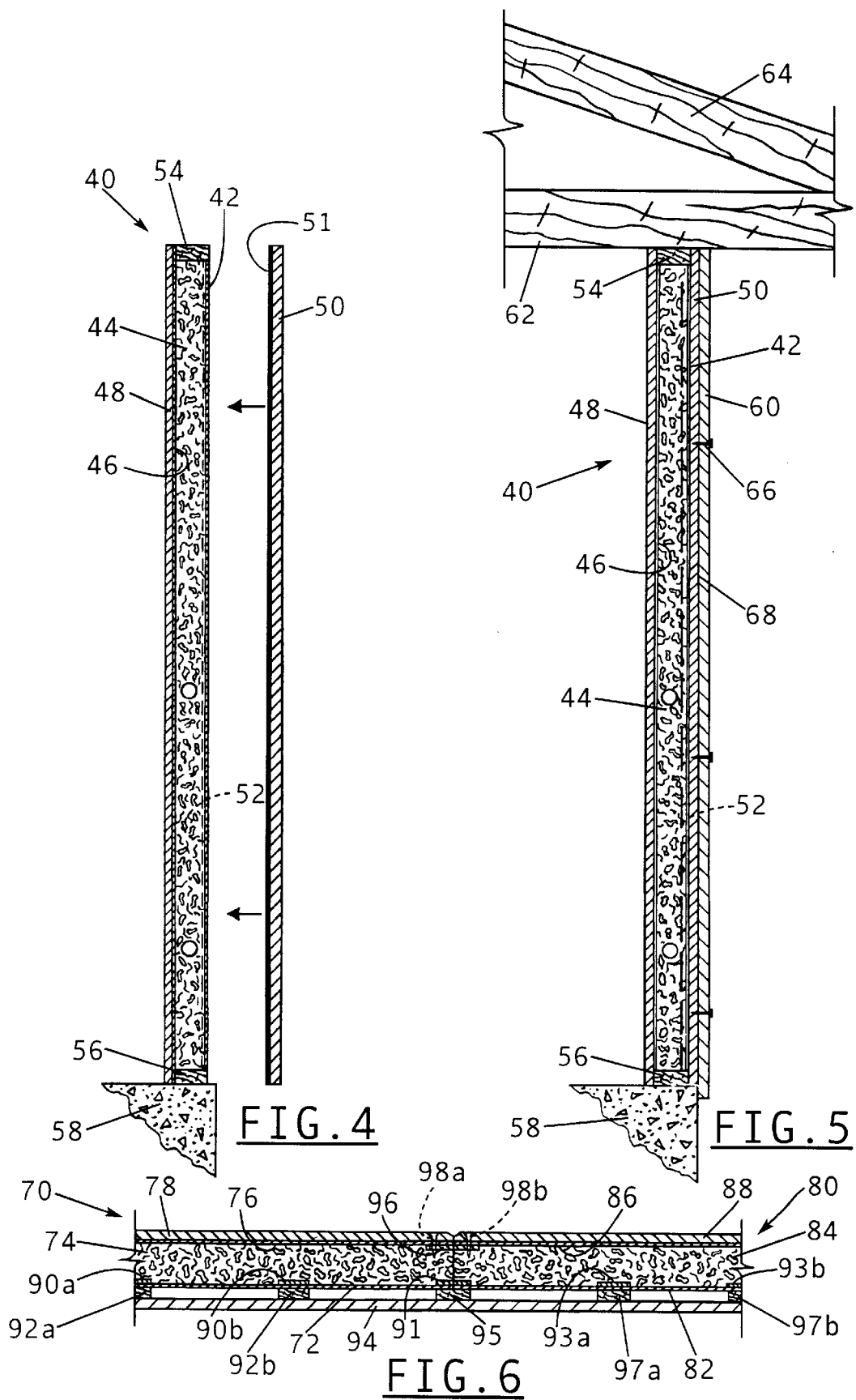

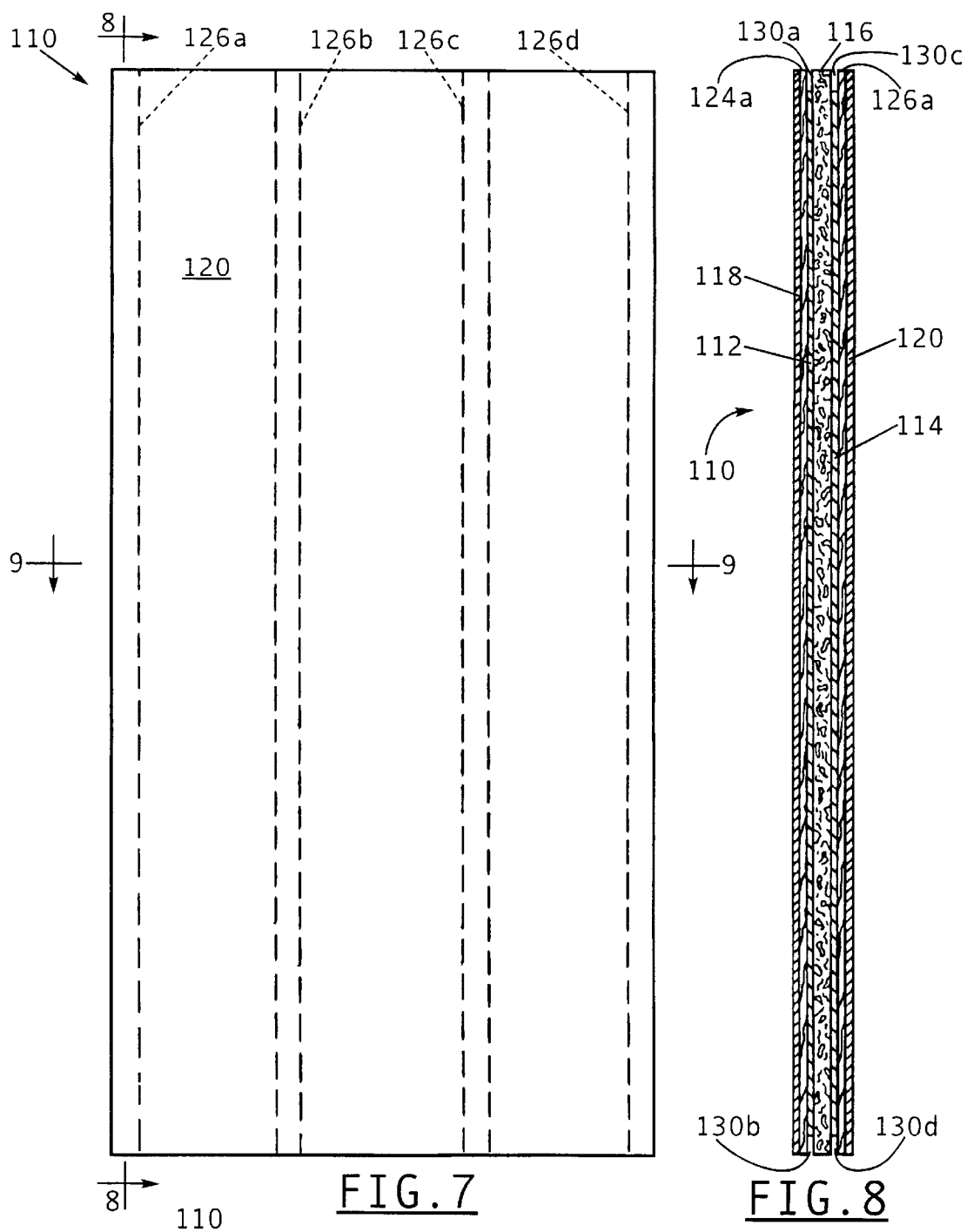

STRUCTURAL INSULATED PANEL

FIELD OF THE INVENTION

This invention relates generally to structural panels for building construction and is particularly directed to a structural insulated panel with improved strength and weather resistance and which affords increased flexibility in installing the panel in a building structure.

BACKGROUND OF THE INVENTION

There is a need for a ready-to-install structural panel for building construction having a weather-resistant exterior surface, a finished interior surface, and an insulating layer between the exterior and interior surfaces which can be economically mass produced and easily installed. The structural panel should be weather-resistant not only when installed in the finished building, but also when initially installed prior to completion in the event inclement weather is encountered during construction. The structural insulated panel should also be adapted for selling in home improvement stores and be capable of being installed by an "amateur" carpenter without the need for additional installation components or special installation design considerations. Moreover, the panel should meet and hopefully surpass local fire codes and should also be insect resistant.

The present invention provides the aforementioned advantages in a structural insulated panel which is weather resistant, fire resistant, easily installed, and is of high strength.

OBJECTS AND SUMMARY OF THE INVENTION

Accordingly, it is an object of the present invention to provide a structural insulated panel having spaced studs attached to its outer surface or disposed within its insulating core which facilitate attachment of an exterior facing to the panel and increase the tensile and compressive strength of the panel.

It is another object of the present invention is to provide a structural insulated panel with a C-shaped channel disposed on one or more edges of the panel to facilitate installation of the panel in a building structure or attachment of the panel to other structural insulated panels.

A further object of the present invention is to provide a structural insulated panel for building construction having an inner metal spline which facilitates installation and attachment of the panel without conducting heat through the panel's insulating core.

Yet another object of the present invention to provide a structural insulated panel for building construction with improved weather resistance both during installation and after the panel is installed.

A still further object of the present invention is to provide a drainage plane for water between an outer facing of a structural insulated panel and the panel's inner insulating core.

This invention contemplates a generally planar structural insulated panel comprising an insulating core having inner and outer opposed surfaces; first and second weather resistant, high tensile strength plastic impregnated paper (PIP) facings respectively attached to the inner and outer opposed surfaces of the insulating core for protecting the insulating core from moisture and increasing the strength of the structural insulated panel; and a plurality of studs attached in a spaced manner to at least one of the first or second PIP facings for increasing the strength of the structural insulated panel and facilitating attachment of an outer facing to the structural insulated panel and installation of the structural insulated panel in a building structure.

This invention further contemplates a structural insulated panel for use in a building structure comprising a generally planar insulating core having first and second opposed surfaces; first and second plastic impregnated paper (PIP) facings respectively disposed on the first and second opposed surfaces of the insulating core; a first plurality of studs attached in a spaced manner to the first PIP facing and a second plurality of studs attached in a spaced manner to the second PIP facing; first and second outer facings respectively disposed on and attached to the first and second pluralities of studs; first and second spaced slots in an edge of the structural insulated panel, wherein the first and second slots are respectively disposed between the insulating core and the first and second pluralities of studs; a generally C-shaped channel inserted in the first and second slots and attached to the first and second pluralities of studs; and a coupler for securely connecting the C-shaped channel to the building structure or to another structural insulated panel.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a plan view shown partially in phantom of a structural insulated panel in accordance with the present invention;

FIG. 2 is a sectional view of the structural insulated panel shown in FIG. 1 taken along sight line 2—2 therein;

FIG. 3 is a sectional view of the structural insulated panel shown in FIG. 1 taken along sight line 3—3 therein;

FIG. 4 is a partially exploded sectional view of another embodiment of a structural insulated panel in accordance with the present invention incorporating spaced exterior nailer strips for attaching an outer facing to the panel;

FIG. 5 is a sectional view showing the structural insulated panel of FIG. 4 installed in a building structure and having exterior siding attached to its outer surface by means of the nailer strips;

FIG. 6 is a sectional view showing a pair of structural insulated panels connected together in an edge-abutting manner in accordance with another aspect of the present invention;

FIG. 7 is a plan view shown partially in phantom of another embodiment of a structural insulated panel in accordance with the principles of the present invention;

FIG. 8 is a sectional view of the structural insulated panel shown in FIG. 7 taken along sight line 8—8 therein;

FIG. 9 is a sectional view of the structural insulated panel shown in FIG. 7 taken along sight line 9—9 therein;

DETAILED DESCRIPTION OF PREFERRED EMBODIMENTS

Figure 10:
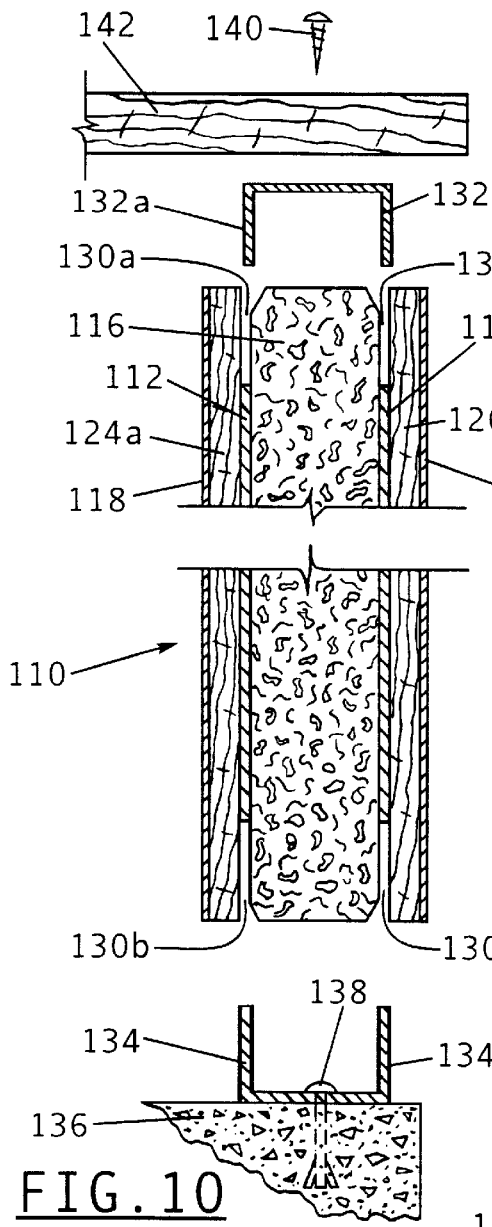
FIG. 10 is a partially exploded sectional view of yet another embodiment of a structural insulated panel in accordance with the present invention illustrating the manner in which the panel in installed in and connected to a building structure.

Referring to FIG. 1, there is shown partially in phantom a plan view of a structural insulated panel 10 in accordance with the principles of the present invention. FIGS. 2 and 3 are sectional views of the structural insulated panel 10 shown in FIG. 1, respectively taken along sight lines 2—2 and 3—3 therein.

The inventive structural insulated panel 10 includes an outer plastic impregnated paper (PIP) facing 12, an inner PIP facing 16, and an insulating core 14. The PIP facings 12, 16 are preferably comprised of paper or box board impregnated with a plastic such as urethane, polystyrene or polyisocyanurate. The plastic impregnated paper is commercially available from Weyerhauser and is sold under the trade name of P-CELL. The panel's insulating core 14 may be comprised of a plastic foam such as of expanded polystyrene or urethane, or may be comprised of an agricultural product such as strawboard or wheatboard. Attached to the inventive structural insulated panel's inner PIP facing 18 is an inner panel facing 16. Any of the more conventional adhesive materials such as urethane or epoxy cement, glue or a mastic coating may be used for bonding the inner PIP facing 18 to the panel's inner facing 16 and insulating core 14 or for securely connecting other components of a structural insulated panel in accordance with the present invention as described below. The panel's inner facing 16 is in the form of a thin sheet and may be comprised of a conventional building material such as of gypsum or cementous composite.

The outer and inner PIP facings 12, 18 substantially increase the racking (bending) strength as well as the tensile strength of the panel and serve as a vapor barrier near the outer and inner surfaces of an exterior wall or roof deck to prevent moisture from entering the insulating core 14 of the structural insulated panel 10 from either the outside environment or from an inside room of a building structure. The PIP layers provide much improved weather resistance over that afforded by other conventional panel layer compositions such as oriented strand board (OSB). As shown in the figures, the panel's inner facing 16 is larger in both height and width than its insulating core 14 to facilitate attachment of the structural insulated panel 10 to 2× dimensional structural members as described below.

Also in accordance with the invention, disposed in a spaced manner in contact with the panel's outer PIP facing 12 are studs 26a, 26b, 26c and 26d. Similarly, disposed in a spaced manner in contact with the panel's inner PIP facing 18 are studs 22a and 22b. Each of these studs is in the form of a thin, elongated, linear member comprised of either metal or wood. The studs substantially increase the panel's tensile and compressive strength and may also be used as nailers for attaching the panel to a building structure or for attaching a structural facing such as of cementous or gypsum composite or exterior siding to the panel. The studs may either be attached to an inner or outer surface of one or both of the panel's PIP facings. When attached to an inner surface of a PIP facing, the stud is disposed within and may also be bonded to the panel's insulating core 14 as shown in FIG. 2.

Also disposed in the panel's insulating core 14 are first, second and third electrical chases 24a, 24b and 24c. The electrical chases 24a, 24b and 24c are adapted to receive and enclose electrical wiring disposed within and extending through the structural insulated panel 10. Also disposed within the panel's insulating core 14 are first and second edge slots 20a and 20b which extend the length of the panel. Each of the first and second edge slots 20a, 20b is formed within an edge portion of the panel's insulating core 14 and is disposed immediately adjacent the panel's inner PIP facing 18. The first and second edge slots 20a, 20b are each adapted to receive a respective spline (not shown) for connecting adjacent panels in an edge-to-edge manner as described below.

Referring to FIG. 4, there is shown a partially exploded sectional view of another embodiment of a structural insulated panel 40 in accordance with the present invention incorporating spaced exterior studs 50 (only one of which is shown in the figure in dotted line form for simplicity) for attaching an outer facing to the panel. As in the previously described embodiment, the structural insulated panel 40 includes outer and inner PIP facings 42 and 46, an inner panel facing 48, and an insulating core 44 disposed between and bonded to the two PIP facings. Disposed within the panel's insulating core 44 are a plurality of spaced interior studs 52 (only one of which is shown in the figures for simplicity). Respective upper and lower edges of the structural insulated panel 40 are adapted for secure attachment to a top plate 54 and a base plate 56, each in the form of conventional 2× lumber members, by conventional means such as nails, screws or an adhesive layer which are not shown in the figures for simplicity. Also as shown in FIG. 4, the base plate 56 is positioned on and attached to a foundation 58. Again, conventional means such as nails or screws may be used to securely attach base plate 56 to foundation 58, although these are also not shown in the figure for simplicity. An adhesive layer 51 is deposited on the inner surface of the exterior studs 50 for securely bonding the exterior studs to the panel's outer PIP facing 42.

As shown in FIG. 5, exterior siding 60 is attached to the exterior studs 50 either by means of an adhesive layer 68 or by a plurality of spaced mounting pins such as screws or nails 66. Because the exterior studs 50 are attached to the structural insulated panel 40 in a spaced manner, spaces between adjacent exterior studs provide a drainage path for any water which penetrates the exterior siding 60 and enters the space between the exterior siding and the panel's weather resistant outer PIP facing 42. The panel's outer PIP facing 42 thus prevents entry of water and water vapor into the panel's insulating core 44 both before and after exterior siding 60 is attached to the structural insulated panel 40 and provides a drainage plane for any water which penetrates the exterior siding 60 attached to the outer surface of the panel. FIG. 5 also shows the top plate 54 positioned in contact with a first roof truss 62. Conventional means such as screws or nails may be used to securely attach the top plate 54 to the first groove truss 62, although these are not shown in the figure for simplicity. A second roof truss 64 attached to and supported by the first groove truss 62 is also shown in FIG. 5.

Referring to FIG. 6, there is shown a sectional view of first and second structural insulated panels 70 and 80 and the manner in which these panels are connected together in an edge-abutting manner in accordance with another aspect of the present invention. As in the previously described embodiments, the first structural insulated panel 70 includes outer and inner PIP facings 72 and 76 and an insulating core 74 disposed between and attached to the outer and inner PIP facings. An inner panel facing 78 is attached to the outer surface of the panel's inner PIP facing 78. Attached in a spaced manner to the panel's outer PIP facing 72 and disposed within the insulating core 74 are a plurality of interior studs 90a and 90b. Interior studs 90a, 90b are preferably comprised of a metal such as aluminum or steel and are in the form of thin, elongated strips. Attached to the exterior surface of the outer PIP facing 72 in a spaced manner are exterior studs 92a and 92b. The second structural insulated panel 80 is similarly comprised of outer and inner PIP facings 82 and 86 and an insulating core 84 disposed between and attached to the outer and inner PIP facings. An inner panel facing 88 is attached to the outer surface of the panel's inner PIP facing 86. Attached to the interior surface of the outer PIP facing 82 and disposed within the panel's insulating core 84 are spaced interior studs 93a and 93b. Attached to the exterior surface of the panel's outer PIP facing 82 are a pair of spaced exterior studs 97a and 97b.

Adjacent edges of the first and second structural insulated panels 70,80 are each provided with a pair of spaced slots along their respective abutting edges. Disposed within a pair of aligned slots in the insulating cores 74 and 84 of the first and second structural insulating panels 70 and 80 is a stud 91. Similar to the previously described studs, stud 91 is preferably comprised of metal, but may also be comprised of wood. Stud 91 is attached to each insulating core and outer PIP facing of the first and second structural insulated panel 70,80 by conventional means such as an adhesive. Similarly, a connecting spline 96 is disposed within aligned slots in the insulating cores 74,84 of the first and second structural insulating panels 70,80. Connecting spline 96 is also in the form of a thin, elongated, linear strip and is preferably comprised of metal, but may also be comprised of wood. First and second connecting pins such as screws or nails 98a and 98b are inserted through the inner facing of a respective panel as well as through the connecting spline 96 for securely connecting the first and second structural insulated panels 70,80.

A stud 95 is affixed to the adjacent outer edges of the first and second structural insulated panels 70,80 and spans the line of abutment between the two panels. Exterior siding 94 is attached to each of the studs 92a,92b,93a,93b and 95 by conventional means such as an adhesive or connecting pins such as screws or nails (which are not shown in the figure for simplicity). Attaching the first and second structural insulated panels 70,80 by means of adhesive bonds as well as by a high strength connecting spline 96 in combination with nails or screws provides a secure joint of high strength between the two panels.

Referring to FIG. 7, there is shown partially in phantom a plan view of another embodiment of a structural insulated panel 110 in accordance with the principles of the present invention. FIGS. 8 and 9 are sectional views of the structural insulated panel shown in FIG. 7 taken respectively along sight lines 8—8 and 9—9 therein. Structural insulated panel 110 includes first and second PIP facings 112 and 114 disposed on and attached to respective outer facing portions of an inner insulating core 116. Disposed on and attached to the outer surface of the first PIP facing 112 in a spaced manner are a plurality of studs 124a, 124b, 124c and 124d. Similarly, attached to an outer surface of the second PIP facing 114 are a second plurality of studs 126a, 126b, 126c and 126d. A first lateral edge of the structural insulated panel 110 is provided with a first pair of spaced edge slots 122a and 122c. Similarly, a second, opposed edge of the structural insulated panel 110 is provided with third and fourth spaced edge slots 122b and 122d. An interior facing 118 such as of dry wall or of a cementous composite is attached to the outer surfaces of each of the first set of studs 124a, 124b, 124c and 124d. Similarly, an exterior facing such as of exterior siding material is attached to the outer surfaces of each of the second set of studs 126a, 126b, 126c and 126d. Again, conventional connecting means such as nails, screws or a high strength adhesive material may be used to securely attach each of the interior and exterior facings 118,120 to the first and second sets of studs, respectively. The studs provide gaps between the panel's first and second PIP facings 112,114 and the interior and exterior facings 118,120. The studs are preferably comprised of sheet metal or wood.

Disposed in the top edge of the structural insulated panel 110 are a pair of spaced top edge slots 130a and 130c, while disposed in the bottom edge of the structural insulated panel are a pair of spaced bottom edge slots 130b, and 130d as shown in FIG. 8. Each top and bottom edge slot is in alignment with a pair of side edge slots so as to form a pair of a spaced slots disposed between the panel's insulating core 116 and the interior and exterior facings 118,120 and extending around the entire periphery of the panel. These edge slots are adapted to receive either a channel or a spline to facilitate secure connection of the panel to either a building structural member or to an adjacent, similar structural insulated panel as described in the following paragraphs.

Figure 11:
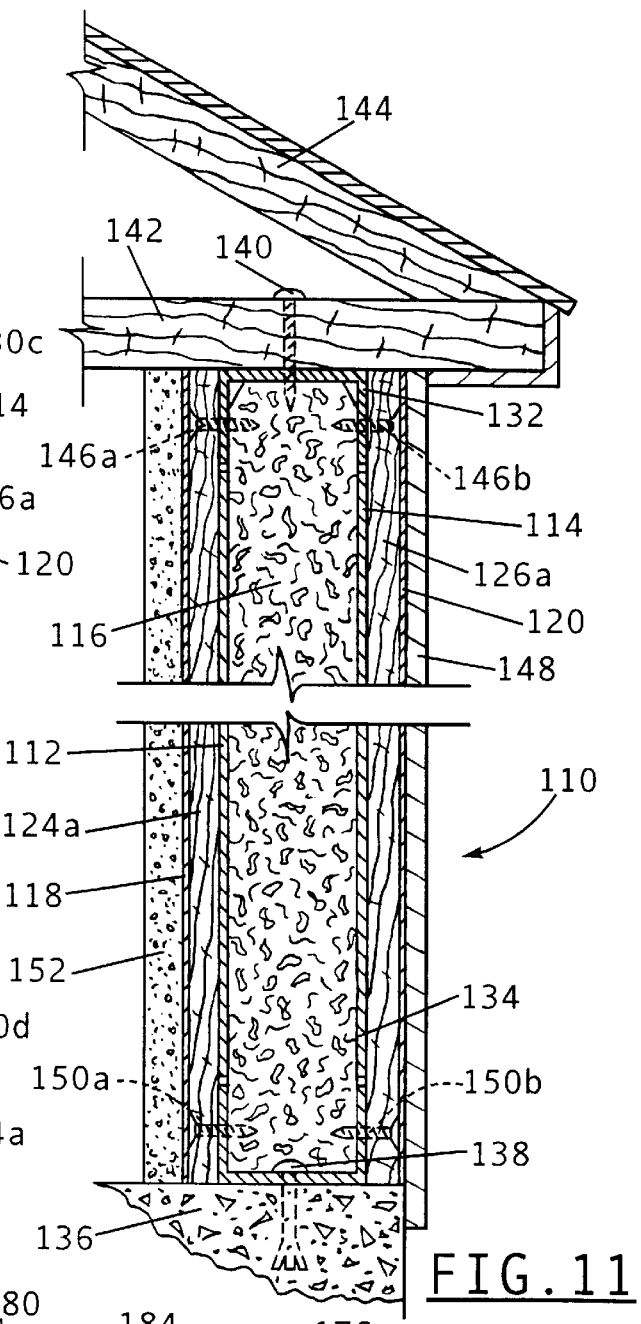
FIG. 11 is a sectional view showing additional details of the manner in which the structural insulated panel of FIG. 10 is installed in a building structure in accordance with this aspect of the present invention.

Each of the top edge slots 130a, 130c is adapted to receive a respective end portion of an upper C-channel 132 as shown in the exploded partial sectional view of FIG. 10. Similarly, each of the bottom edge slots 130b,130d is adapted to receive a respective end portion of a lower C-channel 134. FIG. 11 is a partial sectional view showing the manner in which the structural insulated panel 110 is mounted to structural members such as in a building in accordance with this aspect of the invention. The upper C-channel 132 is connected to a first roof truss 142 by means of a connecting pin 140 such as a screw. The first roof truss 142 is, in turn, connected to and supports a second roof truss 144. Similarly, the lower C-channel 134 is securely connected to the building structure's foundation 136 by means of a second mounting screw 138. Each of the upper and lower C-channels 132, 134 has disposed thereon a respective adhesive layer 132a and 134a as shown in FIG. 10 for secure bonding to the structural insulated panel's insulating core 116 and studs such as shown for the case of studs 124a and 126a in FIGS. 10 and 11. A first pair of mounting screws 146a and 146b (shown in dotted line form) respectively inserted through studs 124a and 126a are further inserted through the upper C-channel 132 and into the panel's insulating core 116 for securing attaching the upper edge of the panel to the first roof truss 142. Mounting screws 146a,146b may be used either in place of or in combination with the aforementioned adhesive layer in attaching the panel's upper edge to the roof truss 142. Similarly, a second pair of mounting screws 150a and 150b (also shown in dotted line form) can be inserted respectively through studs 124a and 126a as well as through the lower C-channel 134 and into the panel's insulating core 116 for securely attaching the lower edge of the structural insulated panel 110 to the building structure's foundation 136. While not shown in the figures, the present invention also contemplates extending the spaced slots disposed between the panel's insulating core and outer facings around the entire periphery of the panel as described above to facilitate attaching all four edges of the panel to a building structure or to other structural insulated panels.

Figure 12:
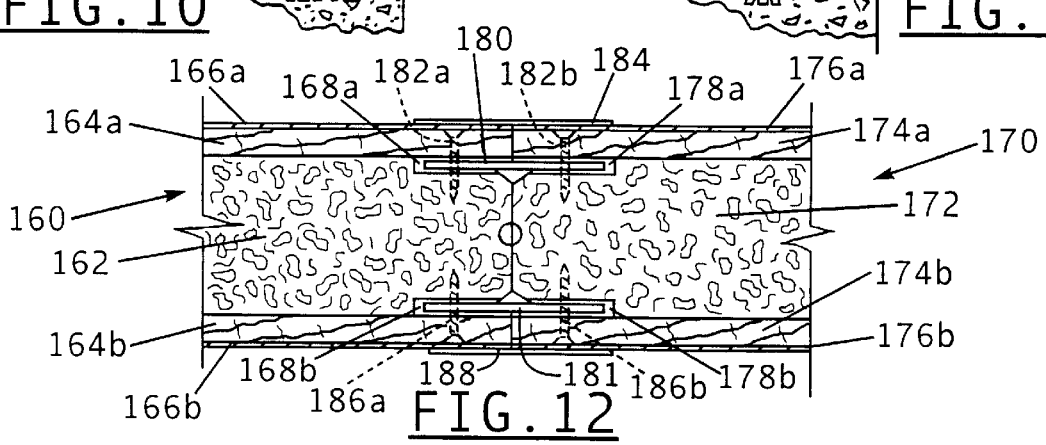
FIG. 12 is a partial sectional view of a pair of structural insulated panels coupled together in an edge-abutting manner in accordance with another aspect of the present invention.

Referring to FIG. 12, there is shown a partial sectional view of a pair of structural insulated panels 160 and 170 coupled together in an edge-abutting manner in accordance with another aspect of the present invention. As in the previously described embodiments, the first structural insulated panel 160 includes an insulating core 162 with opposed first and second PIP facings 161a and 161b to which are attached respective pluralities of spaced studs, with only first and second studs 164a and 164b shown attached to the PIP facings for simplicity. Outer facings 166a and 166b are respectively attached to studs 164a and 164b. A lateral edge of the first structural insulated panel 160 is provided with a pair of spaced edge slots 168a and 168b which are disposed in the panel's insulating core 162. Similarly, the second structural insulated panel includes an insulating core 172 having first and second opposed PIP facings 171a and 171b to which are respectively attached a plurality of spaced studs, with only first and second studs 174a and 174b shown attached to the PIP facings for simplicity. Respectively attached to the first and second studs 174a,174b are first and second outer facings 176a and 176b. The second structural insulated panel 170 also includes a pair of spaced edge slots 178a and 178b disposed within the panel's insulating core 172.

Aligned edge slots 168a and 178a in the first and second structural insulated panels 160, 170 are adapted to receive a first connecting spline 180. Similarly, aligned edge slots 168b and 178b respectively disposed in the first and second structural insulated panels 160,170 are adapted to receive in tight fitting engagement a second connecting spline 181. Each of the coupling splines 180,181 is preferably comprised of metal and may be securely attached to the abutting edges of the adjacent panels by means of an adhesive or connecting pins as shown in FIG. 12. Thus, first and second connecting pins 182a and 182b (shown in dotted line form) are respectively inserted through studs 164a and 174a as well as through the first coupling spline 180 for securely connecting adjacent edges of the panels together. Similarly, third and fourth connecting pins 186a and 186b (also shown in dotted line form) are respectively inserted through studs 164b and 174b as well as through the second coupling spline 181 for securely connecting adjacent edges of the first and second structural insulated panels 160,170. A first tape strip 184 is placed over the joint between the connected panels as well as over the first and second connecting pins 182a, 182b to further strengthen the connection and prevent removal of the connecting pins. Similarly, a second tape strip 188 is disposed over the joint between the two connected panels as well as over the third and fourth connecting pins 186a and 186b. Each tape strip includes an adhesive backing.

There has thus been shown a structural insulated panel for building construction having an inner, generally planar insulating core, and interior and exterior facings of a weather resistant PIP disposed on opposed outer surfaces of the inner insulating core. Spaced studs are attached to either the outer or inner surface of one or both PIP exterior facings and extend the length of the panel. The spaced studs facilitate attachment of the panel to a building structure as well as to another structural insulated panel. When attached to the inner surface of the PIP exterior facing, the studs are disposed within the insulating core. When attached to the outer surface of the insulating core, the studs provide spacing between the panel's insulating core and exterior siding attached to the studs, with the PIP exterior facing serving as a drainage plane for water which may penetrate the exterior siding. The structural insulated panel is particularly adapted for attachment to 2× dimensional structural lumber members along its peripheral edges. Slots are provided in one embodiment of the structural insulated panel between its insulating core and the interior and exterior facings along one or more edges of the panel for receiving a metal C-shaped channel, or spline. The peripheral C-shaped channel substantially increases panel strength, while facilitating connection of adjacent panels together as well as installation of the panel in a building structure without the use of 2× dimensional structural lumber.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawing is offered by way of illustration only and not as a limitation. The actual scope of the invention is intended to be defined in the following claims when viewed in their proper perspective based on the prior art.

I claim:

1. A generally planar structural insulated panel comprising:
   a single, unitary insulating core having inner and outer opposed surfaces;
   first and second weather resistant, high tensile strength plastic impregnated paper facings respectively attached to the inner and outer opposed surfaces of said insulating core for protecting said insulating core from moisture and increasing the strength of the structural insulated panel; and
   a plurality of studs disposed in one of said inner or outer surfaces of said insulating core in a spaced manner from an edge of said core and attached in a spaced manner to one of said first or second facings for increasing the strength of the structural insulated panel and facilitating attachment of an outer facing of the structural insulated panel and installation of the structural insulated panel in a building structure.

2. The structural insulated panel of claim 1 wherein each of said studs is in the form of an elongated, linear strip.

3. The structural insulated panel of claim 2 wherein each of said studs is comprised of metal or wood.

4. The structural insulated panel of claim 1 further comprising first and second adhesive layers respectively disposed between said insulating core and said first and second facings for bonding said facings to said insulating core.

5. The structural insulated panel of claim 1 wherein said insulating core is comprised of plastic foam or an agricultural board.

6. The structural insulated panel of claim 5 wherein said plastic foam is expanded polystyrene or urethane.

7. The structural insulated panel of claim 1 wherein said first and second facings are comprised of paper or box board impregnated with urethane, polystyrene or polyisocyanurate.

8. The structural insulated panel of claim 1 wherein said plurality of studs are attached to said first and second facings.

9. The structural insulated panel of claim 1 wherein said plurality of studs are attached to an inner surface of at least one said first or second facings.

* * * * *

UNITED STATES PATENT AND TRADEMARK OFFICE
CERTIFICATE OF CORRECTION

PATENT NO. : 6,308,491 B1  
DATED : October 30, 2001  
INVENTOR(S) : William H. Porter It is certified that error appears in the above-identified patent and that said Letters Patent is hereby corrected as shown below:

<u>Column 8,</u>  
Line 63, after the word "one" and before "said" please insert -- of --

Signed and Sealed this

Twenty-sixth Day of March, 2002

Attest:

Attesting Officer

JAMES E. ROGAN  
*Director of the United States Patent and Trademark Office*